Dec. 19, 1950  I. C. BLAKE ET AL  2,534,403
PRIMARY CELL
Filed Jan. 19, 1949
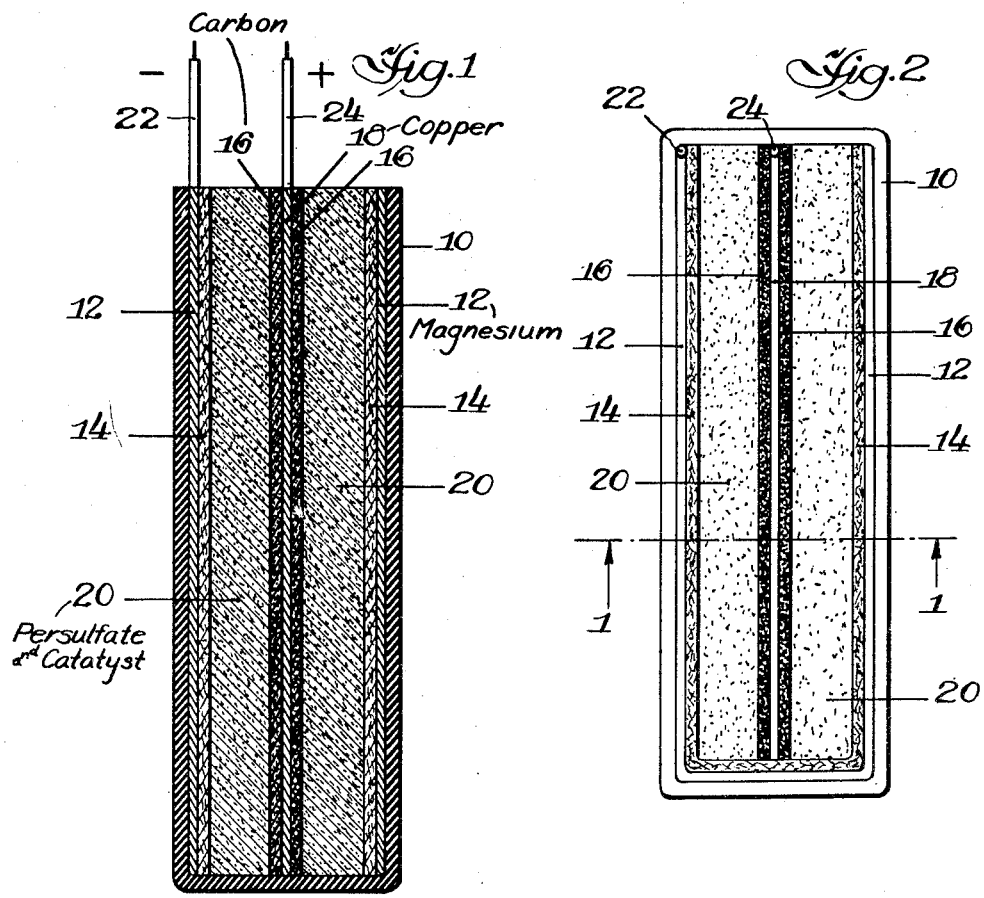
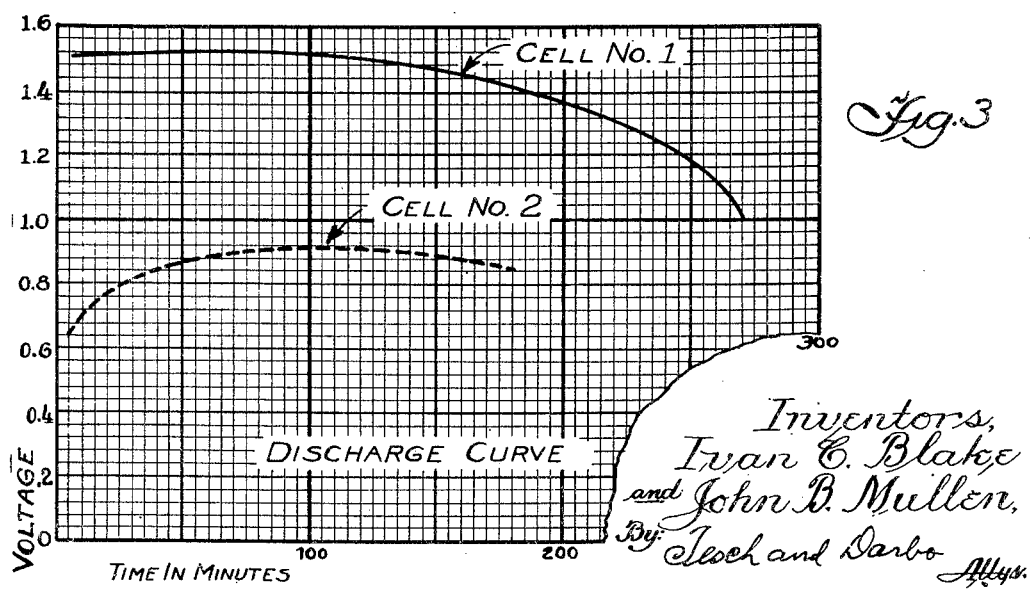
Inventors,
Ivan C. Blake
and John B. Mullen,
By Tesch and Darbo Attys.

Patented Dec. 19, 1950

2,534,403

UNITED STATES PATENT OFFICE 2,534,403

PRIMARY CELL

Ivan C. Blake, Bristol, Wis., and John B. Mullen, Barrington, Ill., assignors, by mesne assignments, to Burgess Battery Company, Freeport, Ill., a corporation of Delaware Application January 19, 1949, Serial No. 71,606

16 Claims. (Cl. 136—100)

This invention relates to improvements in primary cells and is directed particularly to the provision of such a cell having improved means for producing the oxidizing action necessary for the delivery of current, which action is more commonly known as the depolarizing action.

Briefly, the improvement is accomplished by providing as the depolarizing element an ionizable persulfate in the presence of a catalyst having silver as the base thereof.

In the drawing,

Fig. 1 is a sectional view along line 1—1 of Fig. 2 of a cell embodying the invention;

Fig. 2 is a plan view of the cell of Fig. 1, and

Fig. 3 is a set of discharge curves for the cell of the invention and a related cell.

The cell illustrated in Figs. 1 and 2 is a specific example of an embodiment of the invention. It is illustrative only and the invention may be embodied in any other physical form as desired. It consists of an open top casing 10 composed of a suitable non-conductive material, such as phenol-formaldehyde resin. Within the casing is the metal negative electrode 12 which in horizontal section is in the general shape of a U and rests against three of the vertical walls of the casing 10. The negative electrode is preferably composed of magnesium, but may also be composed of any other suitable electronegative metal, such as zinc, manganese or the like. Against the interior surface of the negative electrode 12 rests a layer 14 of bibulous non-conductive material such as blotting paper. Centrally within the space encompassed by the bibulous layer 14 is located the positive electrode 16, which is composed of carbon, but may be composed of other suitable conductive materials, such as copper, silver, platinum, palladium or the like. The carbon electrode 16 is carried by and electrically connected to a conductive supporting sheet 18, which is composed of a suitable conductive metal, such as copper. The sheet 18 is covered on both sides with the carbon which may be applied in the form of a plastic composition such as is described in U. S. Patent No. 1,508,987. On each side of the positive electrode 16 and between the positive electrode and the bibulous sheet 14 is a body 20 of the depolarizing material, which will be described hereinafter. The elements of the cell are under pressure within the casing 10 and the depolarizing body 20 is in pressure contact with the positive electrode 16 and the absorbent sheet 14. The electrodes 12 and 16 have terminal conductors 22 and 24 connected thereto respectively for connection to an external circuit. In the above described cell, if the positive electrode 16 is composed of metal, the supporting sheet 18 is unnecessary.

The cell which has been described is of the deferred action type and is kept in the dry condition until it is desired to place it in operation when a suitable activating liquid is brought into contact with the edges of the bibulous sheet 14 or the depolarizing body 20, whereupon the electrolyte is absorbed by the sheet 14 and the body 20 and spreads throughout the interior of the cell and activates the same.

In accordance with the present invention the depolarizing element 20 is composed of an ionizable persulfate and a catalyst having silver as its base. The persulfates are oxidizing agents but under ordinary circumstances do not perform satisfactorily as a depolarizer. In accordance with the present invention it has been discovered that when silver or a suitable silver compound is included in contact with the persulfate a very effective depolarizing action is obtained. This is apparently due to a catalytic action by the silver or silver compound. In "A Comprehensive Treatise on Inorganic and Theoretical Chemistry," by Mellor, vol. 10 (1930), p. 469, it is stated that the presence of silver ions causes the catalytic decomposition of persulfates. In a primary cell the silver or silver compound exerts a catalytic effect upon the persulfate whereby the latter is reduced and caused to perform in a very effective manner as a depolarizer. The silver ion may be the catalyst, but the action is not fully understood. The catalyst composed of silver or the silver compound will herein be called a silver base catalyst for the reduction of persulfates.

Any of the ionizable persulfates may be used, such as the persulfate of potassium, sodium, ammonium, lithium, barium or silver. In the case of the silver persulfate, a separate catalyst is not required and the silver ion of the persulfate may be the catalyst. The persulfates of the alkali metals sodium and potassium are preferred because they produce very satisfactory performance and are readily available.

Any suitable silver base catalyst for the reduction of persulfates may be used. It may be composed of the metal silver or of a silver compound. Water insoluble compounds may be used, such as the chloride, bromide, iodide, carbonate or oxide of silver. Water soluble silver compounds may also be used which in the course of action within the cell are converted into insoluble compounds. Examples are silver nitrate, silver sulfate and silver acetate which are converted into silver oxide in accordance with the equation:

$$2AgNO_3 + K_2S_2O_8 + 2H_2O \rightarrow 2AgO + K_2SO_4 + H_2SO_4 + 2HNO_3$$

The depolarizing element 20 may be in the form of an intimate mixture of the persulfate and silver base catalyst in finely divided form, or it may be in the form of separate layers of the catalyst and the persulfate. As a further alternative, the depolarizing element 20 may consist of the catalyst only and the persulfate may be introduced in solution in the electrolyte. Also, when the catalyst is metallic silver, it may be present as the positive electrode 16 and the body 20 may be composed of the persulfate only. The silver catalyst may also be in the form of a body connected to the positive electrode and in contact with the body 20 of persulfate, or it may be in the form of finely divided particles, which may be colloidal in size, in admixture with the persulfate to form the body 20. In each of the alternatives, the persulfate and the catalyst are in contact with each other. The form in which the two substances are intimately mixed has been found to produce superior performance.

The deferred action cell which has been described may be activated by plain water or a suitable aqueous electrolyte solution, such as a dilute solution of sodium chloride in water. If desired the solid electrolyte compound may be incorporated in the layer 14 or body 20 and will go into solution when water is added to activate the cell.

A specific example of a preferred form of cell is one in which the negative electrode 12 is composed of magnesium, the positive electrode 16 of carbon and the depolarizer 20 of an intimate mixture of powdered potassium persulfate and silver chloride. This latter mixture is preferably formed into a solid mass by a suitable binder, such as polyvinyl acetate which may be incorporated into the mixture by first being dissolved in a volatile solvent such as ethyl acetate. A suitable composition for the mass is as follows:

| | Parts by weight |
|---|---|
| Potassium persulfate | 6.5 |
| Silver chloride | 3.32 |
| Polyvinyl acetate | 0.5 |
| Ethyl acetate | 4.5 |

A paste of the above composition is applied to both sides of the positive electrode 16 and the solvent then evaporates, leaving a solid liquid absorbent depolarizing body. The electrode 16 with the two layers of depolarizer 20 is incorporated in a cell of the structure described heretofore. Such a cell may be activated by the addition of plain water or a suitable aqueous electrolyte solution as described heretofore.

A water insoluble silver halide is an oxidizing or depolarizing agent in its own right in a deferred action cell of the character which has been described, and in the specific depolarizing composition described above the silver chloride acts as a depolarizer as well as a catalyst to activate the potassium persulfate. This is true of any of the silver catalysts which are also depolarizers, such as the insoluble silver halides.

To show the effect brought about by employing the silver catalyst with the persulfate, reference is made to the curves in Fig. 3 which are the voltage discharge curves for two cells which were identical except that cell No. 2 had a carbon electrode similar to the electrode 16 described heretofore and cell No. 1 had a sheet of silver as the positive electrode. Both cells had magnesium as the negative electrode and potassium persulfate alone as the depolarizer. In cell No. 1 the silver sheet served both as the positive electrode and the catalyst to activate the potassium persulfate. Each of the cells was activated by tap water, and was discharged continuously by having the terminals thereof connected together through a resistance of 7.5 ohms. The solid line curve is for cell No. 1 and the dotted line curve is for cell No. 2. Cell No. 1 had an initial voltage of 1.5 volts which was maintained constant for about 100 minutes when the voltage began to decline and reached 1.0 volt after 270 minutes of service. Cell No. 2 had an initial voltage of 0.6 volt which gradually increased to a maximum of 0.9 volt after 120 minutes of operation and then began to decline. The curves show the remarkable improvement in discharge performance produced by the presence of the silver catalyst.

While definite proportions of the persulfate and silver chloride have been given in the foregoing specific example, the invention is not limited to such proportions. Current delivering capacity is realized upon the addition of a very small amount of silver catalyst to the cell. For example, in a cell employing potassium persulfate and silver nitrate satisfactory results are obtained with an amount of silver nitrate equal to 3% of the total weight of the persulfate and the catalyst. The invention contemplates the use of widely varying proportions of the persulfate and the catalyst. While a cell of the deferred action type is described and illustrated, the invention is not limited thereto and may be applied to cells in which the activating liquid is introduced at the time of manufacture.

What is claimed is:

1. In a primary cell, positive and negative electrodes and a depolarizer comprising an ionizable persulfate and a silver base catalyst for the reduction of persulfates.

2. A primary cell as claimed in claim 1 in which the ionizable persulfate is potassium persulfate.

3. A primary cell as claimed in claim 1 in which the persulfate is sodium persulfate.

4. A primary cell as claimed in claim 1 in which the persulfate is ammonium persulfate.

5. A primary cell as claimed in claim 1 in which the persulfate is lithium persulfate.

6. A primary cell as claimed in claim 1 in which the catalyst is a water insoluble silver halide.

7. A primary cell as claimed in claim 1 in which the catalyst is silver nitrate.

8. A primary cell as claimed in claim 1 in which the catalyst is silver.

9. A primary cell as claimed in claim 1 in which the catalyst is silver oxide.

10. A primary cell as claimed in claim 1 in which the catalyst is silver carbonate.

11. In a primary cell, positive and negative electrodes and a depolarizer comprising potassium persulfate and silver nitrate.

12. In a primary cell, positive and negative electrodes and a depolarizer comprising potassium persulfate and silver chloride.

13. In a primary cell, positive and negative electrodes and a depolarizer comprising silver persulfate.

14. A primary cell as claimed in claim 1 in which the negative electrode is composed of magnesium.

15. In a primary cell, a silver positive electrode and a negative electrode and a depolarizer comprising an ionizable persulfate.

16. In a primary cell having positive and negative electrodes, an ionizable persulfate in contact with the positive electrode and a silver base catalyst for the reduction of persulfates in contact with said persulfate.

IVAN C. BLAKE.
JOHN B. MULLEN.

REFERENCES CITED

The following references are of record in the file of this patent:

UNITED STATES PATENTS

| Number | Name | Date |
|---|---|---|
| 1,147,753 | Schatzel | July 27, 1915 |
| 1,771,190 | Polcich | July 22, 1930 |
| 2,445,306 | Lawson | July 13, 1948 |

FOREIGN PATENTS

| Number | Country | Date |
|---|---|---|
| 307,050 | Great Britain | Dec. 28 1928 |

OTHER REFERENCES

Mellor, J. W., Comprehensive Treatise on Inorganic and Theoretical Chemistry, vol. 10 (1930), page 469.